US 6,742,976 B2

(12) United States Patent
Groll

(10) Patent No.: US 6,742,976 B2
(45) Date of Patent: Jun. 1, 2004

(54) RIBBED DOWEL

(76) Inventor: Paul Groll, 4780 NW. 128th St., Opalocka, FL (US) 33054

( * ) Notice: Subject to any disclaimer, the term of this patent is extended or adjusted under 35 U.S.C. 154(b) by 0 days.

(21) Appl. No.: 10/177,294

(22) Filed: Jun. 21, 2002

(65) Prior Publication Data

US 2003/0095853 A1 May 22, 2003

Related U.S. Application Data

(63) Continuation-in-part of application No. 09/996,459, filed on Nov. 20, 2001.

(51) Int. Cl.⁷ ................................. F16B 15/08
(52) U.S. Cl. .................. 411/452; 411/439; 411/451.1; 411/446
(58) Field of Search ................. 411/452, 439, 411/451.1, 446

(56) References Cited

U.S. PATENT DOCUMENTS

| | | | | | |
|---|---|---|---|---|---|
| 1,989,018 | A | * | 1/1935 | Norwood | 411/352 |
| 2,219,197 | A | * | 10/1940 | Purtell | 411/452 |
| 2,223,871 | A | * | 12/1940 | Johnson | 411/453 |
| 2,251,202 | A | * | 7/1941 | Purtell | 411/452 |
| 3,510,979 | A | * | 5/1970 | Fischer | 446/102 |
| 3,550,244 | A | * | 12/1970 | Villo et al. | 29/407.05 |
| 3,689,075 | A | * | 9/1972 | Adelsohn | 273/157 R |
| 3,791,750 | A | * | 2/1974 | Cameron | 403/297 |
| 3,883,258 | A | * | 5/1975 | Hewson | 403/298 |
| 3,942,407 | A | * | 3/1976 | Mortensen | 85/71 |
| 3,964,879 | A | * | 6/1976 | Asmus | 29/183.5 |
| 3,966,339 | A | * | 6/1976 | Nemecek et al. | 403/292 |
| 4,087,928 | A | * | 5/1978 | Mickus | 37/142 A |
| 4,340,330 | A | * | 7/1982 | Reidel | 411/33 |
| 4,454,669 | A | * | 6/1984 | Simmons | 52/585 |
| 4,650,373 | A | * | 3/1987 | Seegmiller | 405/260 |
| 4,666,345 | A | * | 5/1987 | Seegmiller | 405/260 |
| 4,762,454 | A | * | 8/1988 | Davis | 411/446 |
| 4,893,973 | A | * | 1/1990 | Herb | 411/55 |
| 5,192,169 | A | * | 3/1993 | Landsberg | 405/259.1 |
| 5,195,859 | A | * | 3/1993 | Thorton | 411/510 |
| 5,252,017 | A | * | 10/1993 | Hodel | 411/446 |
| 5,549,431 | A | * | 8/1996 | Royle | 411/389 |
| 5,688,066 | A | * | 11/1997 | Loose | 403/297 |
| 5,931,619 | A | * | 8/1999 | Hartmann | 411/60 |
| 6,254,301 | B1 | * | 7/2001 | Hatch | 403/298 |

* cited by examiner

*Primary Examiner*—Robert J. Sandy
*Assistant Examiner*—Carlos Lugo
(74) *Attorney, Agent, or Firm*—Robert M. Schwartz

(57) ABSTRACT

A ribbed dowel for aligning workpieces is disclosed including a cylindrical body having an outer surface, a first end, and a second end, a plurality of ribs spaced over the outer surface, a round circular first face on the first end, a round circular second face on the second end, and wherein the ribbed dowel is composed of a material other than a polypropylene homopolymer having a density of 0.905 g/cm³, a melt flow rate of 60 g/10 min, a Rockwell hardness of 107, a Durometer hardness of 84, and a melting point of 330° F.

17 Claims, 6 Drawing Sheets

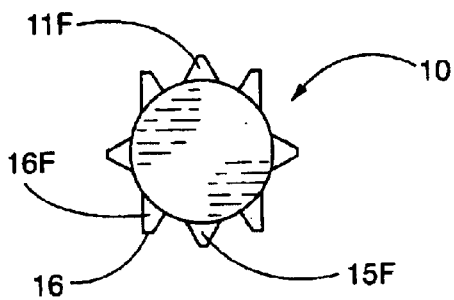
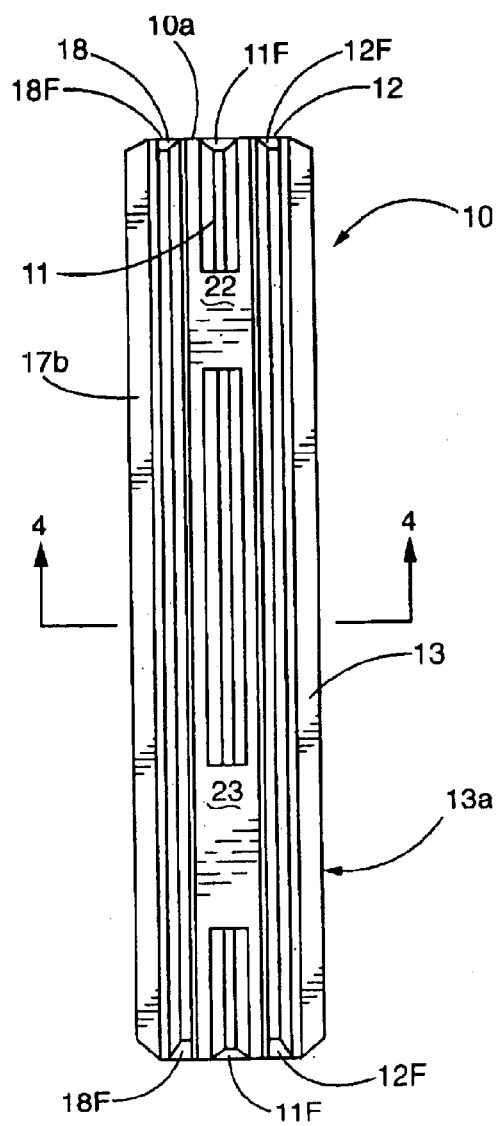

RIBBED DOWEL

CROSS-REFERENCES TO RELATED APPLICATION

This application is a Continuation-In-Part of U.S. patent application Ser. No. 09/996,459, filed on Nov. 20, 2001, entitled RIBBED DOWEL.

TECHNICAL FIELD

The present invention relates generally to a dowel for aligning workpieces. More specifically, the present invention relates to a dowel to align two workpieces or a cabinet wall and a shelf of a cabinet in place, without an adhesive, using a friction fit.

BACKGROUND OF THE INVENTION

The present invention is a dowel that is used to align two workpieces. Typically, a dowel is inserted into the openings of the two workpieces, previously glue or other adhesive or the friction fit of the dowel within the openings of the workpiece would hold the two workpieces together.

SUMMARY OF THE INVENTION

This present invention is an improved dowel with longitudinal ribs that is used to align two workpieces or a cabinet wall and a shelf of a cabinet in place, without an adhesive, using a friction fit. Previously, when adhesive was used, the workpieces could not be separated. This provides the advantage of having a knock-down capability, so that the workpieces can be disengaged or knocked down, when desired. Another advantage of the present invention is its improved latitude for tolerance variations providing a greater ability to adjust for missed tolerances, when the two workpieces are not exactly aligned. In a production line, drilling machines that make the openings to receive the dowels have a tolerance of plus or minus 0.5 mm to where the bore hole is located on the workpiece. When aligning two bores, to receive the same dowel, the error between the center lines of the bore holes can be as much as 1.0 mm, because of the errors in tolerance of the drilling machines in placement of the holes on each opposing workpiece.

In the present invention, the diameter of the bore hole in each workpiece is 0.270 inches. In the event the two workpieces are not aligned center to center, or the holes in each workpiece are not drilled in the right location, the dowel of the present invention can fit in both holes, when the centers of the holes are off as much as 0.070 inches (1.75 mm).

The adjustment the dowel can absorb is equal to twice the height of a rib of the dowel, which is 0.035 inches. This is because the ribs on both sides of the dowel are used, they represent an adjustment of twice 0.035 inches or 0.070 inches. The dowel of the present invention provides a method and apparatus to use a dowel in two workpieces, when the alignments of the bores of the two workpieces are off by as much as twice the height of the rib on the dowel. The rib height of the dowel is the distance from the base of the rib to the top of the rib.

The rib material is strong enough to carry substantial weight, but is soft enough to bend and shear. Specifically, the separation or shearing of the rib from the dowel only requires approximately ten (10) pounds of strength. The dowel is capable of supporting a load of approximately twenty (20) pounds.

DESCRIPTION OF THE DRAWINGS

FIG. 1 is a front-end view of the dowel of the present invention.

FIG. 2 is the top view of the dowel.

DESCRIPTION OF ILLUSTRATIVE PREFERRED EMBODIMENTS

Figure 3:
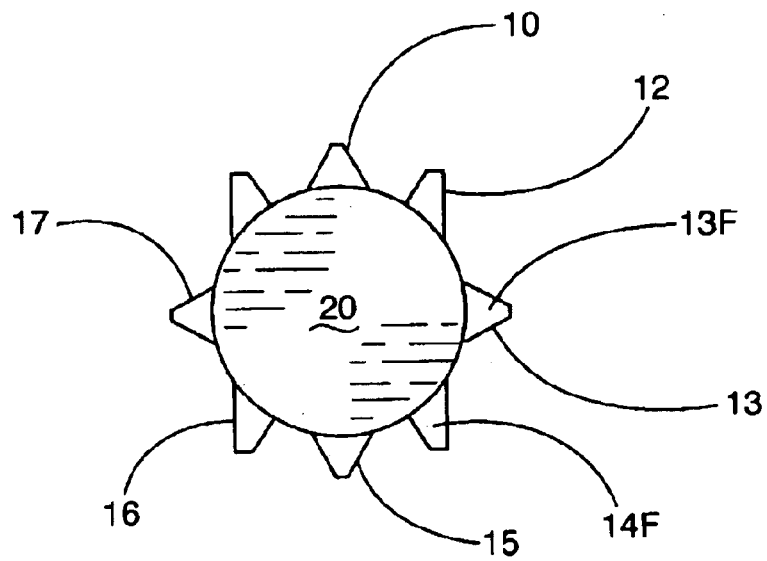
FIG. 3 is the rear-end view of the dowel of the present invention.

Referring to FIG. 2, dowel 10 of the present invention, has an elongated cylindrical body with a length greater than its diameter. Dowel 10 is shaped to have a plurality of ribs 11, 12, 13, 14, 15, 16, 17 and 18. It can be noted that pairs of said ribs are spaced on opposite sides of cylindrical dowel 10. Thus, ribs 11 and 15 form a first pair of opposed ribs, ribs 13 and 17 form a second pair of opposed ribs, ribs 14 and 18 form a third pair of opposed ribs, and ribs 12 and 16 form a fourth pair of opposed ribs. Dowel 10 therefore, has a first outside diameter d' which is measured at locations on the dowel where there are no ribs and a second outside diameter d", measured at a location on the dowel where there are opposed pairs of ribs. The overall outside diameter of d' of the preferred embodiment is 0.200 inches and the overall outside diameter d" is 0.270 inches. Thus, the outside diameter measured at each pair of ribs is approximately 0.270 inches, and the outside diameter at each of the valleys between the adjacent ribs is 0.200 inches. It can also be seen that pairs of ribs have different shapes. Ribs 11 and 15 are generally triangular in shape, with sidewalls 11a and 11b forming an angle 11c of 60°. Again, being noted that opposed ribs 11 and 15 are complimentary and identical in shape. Likewise, ribs 13 and 17 are complimentary and identical, having walls 17a and 17b and 13a and 13b that each form an angle of 60°. Thus, ribs 13 and 17 have side walls 13a and 13b that form an angle of 60°.

Figure 4:
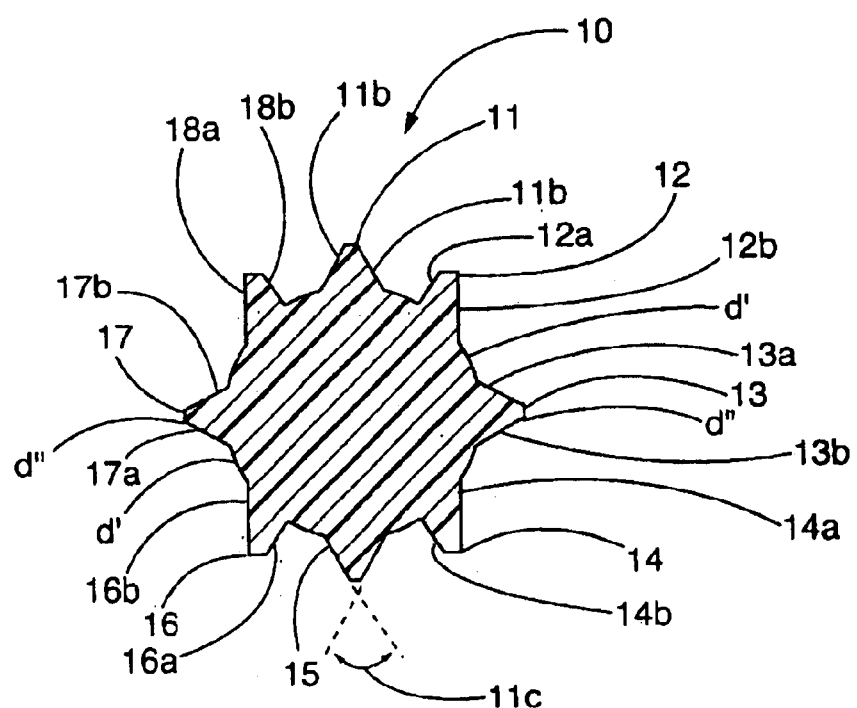
FIG. 4 is a cross-section of the dowel along lines 4—4 of FIG. 2.

Likewise, opposed ribs 12 and 16 and 14 and 18 have complementary and identical shapes. As seen in FIG. 4 ribs 16 and 12 have vertical side walls 16b and 12b respectively and shorter angled side walls 16a and 12a respectively.

Likewise ribs 14 and 18 have complementary and identical shapes. As seen in FIG. 4 ribs 14 and 18 have vertical side walls 14a and 18a respectively and shorter angled side walls 14b and 18b respectively.

Referring to FIG. 1, it can be seen that dowel 10 includes a front face having a circular perimeter corresponding to diameter d', a round circular face 19 and an opposite round circular face 20 (FIG. 3), at the opposite end of dowel 10. The outside perimeter portion of faces 19 and 20 correspond to diameter d'.

Referring to FIG. 2, it can be seen that each rib has a tapered front and rear face that is slanted towards the center of dowel 10 from the intersection of each respective round face 19 and 20. Each said tapered face is marked with a corresponding letter F, e.g., 11 through 18. It being noted that both ends of dowel 10 are substantially identically. Thus, each rib at each end has a tapered face that intersects with and meets the respective round face 19 or 20.

Rib 11 differs from the other ribs in that it is not contiguous along its length. Rib 11 has two gaps. A first gap 22 and a second gap 23. These gaps, as are known in the art, allow the ejector pin in the rolling process to avoid the spick ejector pin in the manufacturing process.

The dowel of the present invention is made of a high impact strength polymer material. Different polymers have different properties as a result of the differences in their chemical structure. Thus, some polymers are better suited for some applications than are others, by design.

The polymer materials that can be used to construct the dowel of the present invention include polyolefins, such as polypropylene copolymers, polypropylene blends with homopolymer and/or copolymer polypropylene, polyethylene, polyethylene blends, and filled polypropylenes. The polymer materials may further include Acrylonitrile-Butadiene-Styrene (ABS), nylons, and high-impact polystyrene.

Polyolefin materials, such as those mentioned above are typically economical, lightweight thermoplastics with characteristics including excellent chemical resistance, low moisture absorption, good impact strength, excellent low-temperature properties, low coefficient of friction, and abrasion resistance. Formulations can include sheet, rod and tube. Some forms of polyolefins have extremely high abrasion resistance. Polyolefins may also have exceptional impact resistance, even at cryogenic temperatures. Other advantages include low moisture absorption, good electrical and thermal insulation, self-lubrication and chemical inertness (except in some acids). As will be seen, the qualities of the polyolefins generally form a dowel that is sufficiently rigid and suitably flexible and allows the ribs to flex and/or shear off when dowel is inserted into bore holes in workpieces.

Acrylonitrile-Butadiene-Styrene, also known as ABS, has been mass-produced since 1960's. ABS is a thermoplastic, and is tough, hard and rigid with a molecular composition of roughly half styrene, ¼ acrylonitrile, and ¼ butadiene molecules. ABS additionally has good chemical resistance and dimensional stability, creep resistance, it is electroplatable, has moderate strength, and is inexpensive.

Polystyrene is a vinyl polymer and is a clear amorphous thermoplastic polymer formed by oxidation of styrene monomer by heat or peroxide. It has a carbon backbone that incorporates phenyl groups (six-member carbon rings) attached randomly along its length. Molecules of polystyrene are prevented from becoming highly aligned by the random attachment of benzene. The molecular structure of polystyrene results in its relative brittleness, high transparency, and insulating properties. A solution of polybutadiene rubber and styrene monomer is polymerized to make impact modified medium impact (MIPS) and high impact polystyrene (HIPS). High impact polystyrene is excellent for a variety of applications requiring extra durability, such as the dowel of the present invention.

Nylons are polymers having a main polymer chain that comprises amide groups. There are numerous types of nylons suitable for the present invention. Type 6 provides a good durable nylon at low cost. Type 6.6 offers better wet and dry stiffness than type 6. Type 6.6 also provides excellent bend recovery and abrasion resistance. Type 6.12 is commonly used in applications calling for low water absorption. It has excellent recovery, high heat and abrasion resistance. There is an additional type 6.6 nylon that is electrically conductive for anti-static applications, as well as a heat stabilized form incorporating a monofilament that is designed to withstand elevated temperatures.

Prior to the present invention, a particular polypropylene homopolymer was utilized by the applicant as the sole component of the dowel. Polypropylene homopolymer incorporates a methyl group and is in the form of a linear, unbranched chain. The crystalline nature of polypropylene homopolymer results in a post-molded article that is not dimensionally stable until full crystallization has taken place. This can take significant time and involve movement in the article. The polypropylene homopolymer of the prior dowel had a density of 0.905 g/cm$^3$. A melt flow rate (230° C./2.16 kg-L) for this polypropylene homopolymer was measured as 60 g/10 min. Notched Izod Impact at 73° F. was found to be 0.40 ft-lb/inch, while Unnotched Izod Impact (also at 73° F.) was found to be 16.0 ft-lb/inch. Moreover, the prior polypropylene homopolymer had (R-scale) Rockwell harness of 107 and a Durometer hardness of 84. Additionally, the prior polypropylene homoploymer had a melting point of 330° F. and a processing temperature of between 370° to 450° F. The polypropylene homopolymer having these properties and used to make the dowel or of the present invention lacked the expected rigidity required for the application of the dowel to align workpieces. Thus, the polypropylene homopolymer having the above-described properties is unsuitable as a sole component of the dowel. However, other polypropylene homopolymers can be used to make the dowel of the present invention.

Figure 5:
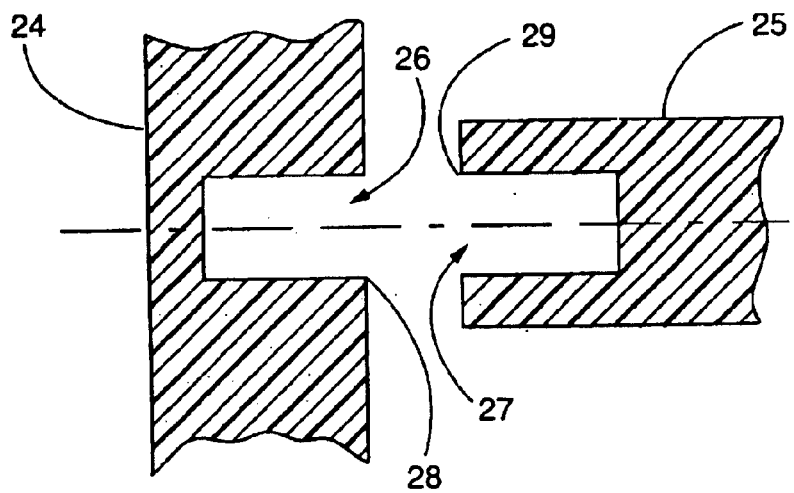
FIG. 5 is a cross sectional view of two workpieces showing the bores in the respective workpieces where the dowel would be located with the two workpieces aligned.

The dowel 10 is used in combination with workpieces that are to be joined. Referring to FIG. 5, a first workpiece 24 may be a vertical wall of a cabinet. Workpiece 25 may be, for example, a horizontal shelf of a cabinet. Each workpiece will have one or more openings; bore holes to receive a dowel 10. As shown in FIG. 5, wall 24 has a board opening bore hole 26 and shelf 25 has a board opening bore hole 27. The drilling of bore holes 26 and 27 is well known in the art. The workpieces 24 and 25 are generally made of particle board with a plastic veneer melamine finish or vinyl finish. Though the workpieces can be of any material wood or plastic that is finished or unfinished. Typically, wall 24 will have a thickness of ⅝ inch to ¾ inch and typically, shelf 25 will have a thickness of ⅝ inch or ¾ inch. The perimeter outside edges 28 and 29 of each bore hole 26 and 27 respectively are sharp and act like a cutting edge.

Figure 7:
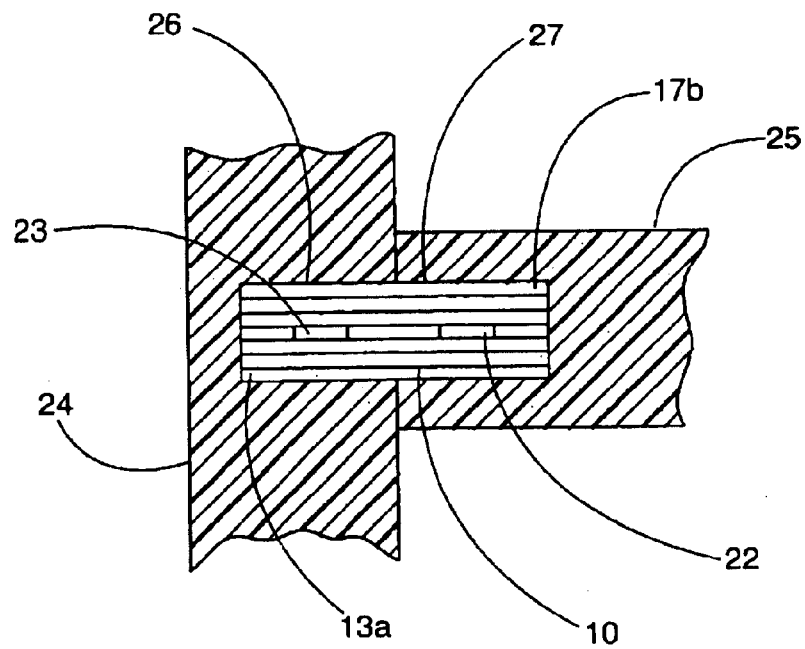
FIG. 7 is a cross sectional view of two workpieces showing the bores in the respective workpieces where the two workpieces are aligned and with the dowel in place.

During the manufacturing process, it will be desired to join a shelf 25 to a wall 24. Critical will be the alignment of prebored holes 26 and 27 in the respective workpiece. The bore holes 26 and 27 are predrilled to be located in a certain location according to a certain plan with manufacturing tolerances. Preferably the bore holes 26 and 27 will be in alignment as shown in FIG. 5. In this instance a first end 10a of dowel 10, during the manufacturing process, is inserted into a first bore opening 26 of a first workpiece 24. During manufacturing, a second workpiece 25 is aligned with the first workpiece 24 and the two workpieces are urged closer until they are in a desired mated relationship. In this instance, as shown in FIG. 7 a shelf workpiece 25 abuts a wall workpiece 24. If the bore holes 26 and 27 within said workpieces 24 and 25 respectively are properly drilled, then the two bore holes, 26 and 27 will be in alignment and dowel 10 will fit within both said bore holes 26 and 27.

However, if the tolerance of the bore holes 26 and 27 are such that they are not in alignment, either because of the tolerances of the drilling of said bore holes 26 and 27 or because of the alignment of the two workpieces 24 and 25, then the two bore hole 26 and 27 will not be or would not be in alignment. In this instance, the alignment will be as in FIGS. 6 and 8.

Figure 6:
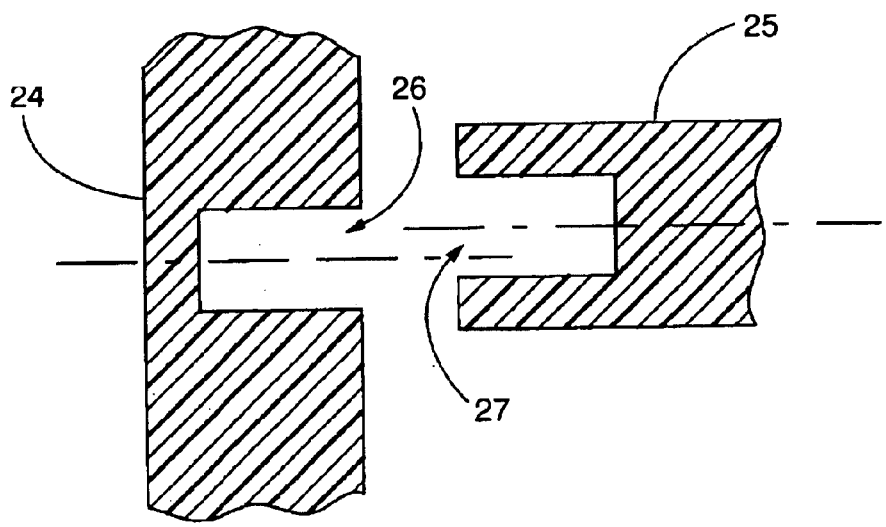
FIG. 6 is a cross sectional view of two workpieces showing the bores in the respective workpieces where the dowel would be located when the two workpieces are not aligned.
Figure 8:
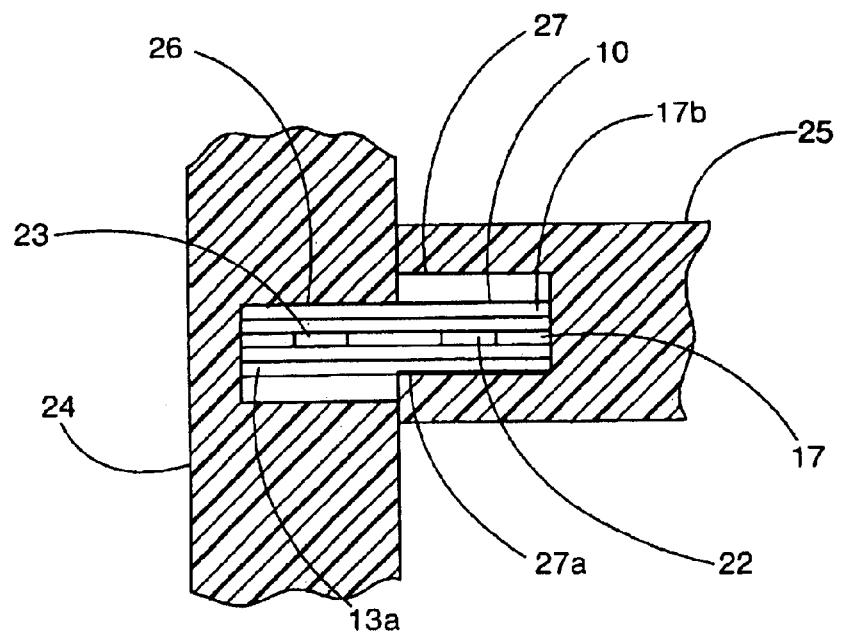
FIG. 8 is a cross sectional view of two workpieces showing the bores in the respective workpieces where the two workpieces not aligned by the distance of the height of one rib and with the dowel in place.

FIG. 6 shows the bore holes 26 and 27 not in alignment and FIG. 8 shows the dowel 10 of the present invention, as it is intended to work within the two bore holes 26 and 27 where workpieces 24 and 25 are in a butted relationship with an end of one workpiece 25 against the planar wall of the second workpiece 24.

Referring to FIG. 8, dowel 10 is shown as the top view seen in FIG. 2. Since dowel 10 is cylindrical, any portion of dowel 10 could have been seen. Of particular interest, rib 17 extends the entire length of dowel 10. Rib 13 only extends the approximate length of bore hole 26 because the balance of rib 13 has been either (sheared) shaved off; or flattened within bore hole 27 or within bore hole 26 or both.

Figure 9:
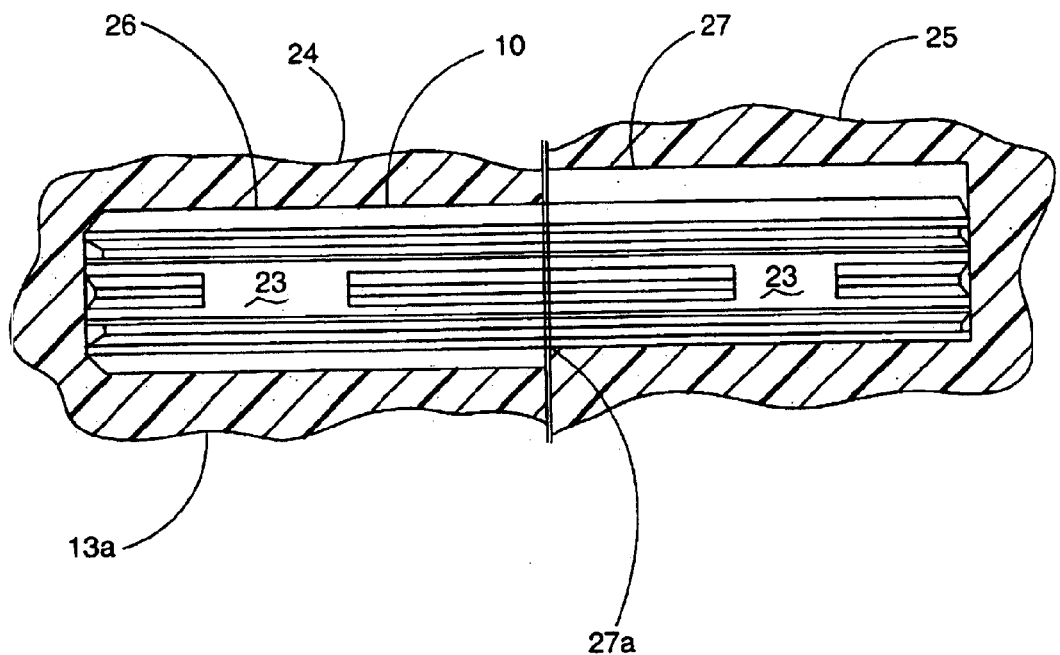
FIG. 9 is an enlargement of the dowel and partial view of the surrounding workpieces of FIG. 8.
Figure 10:
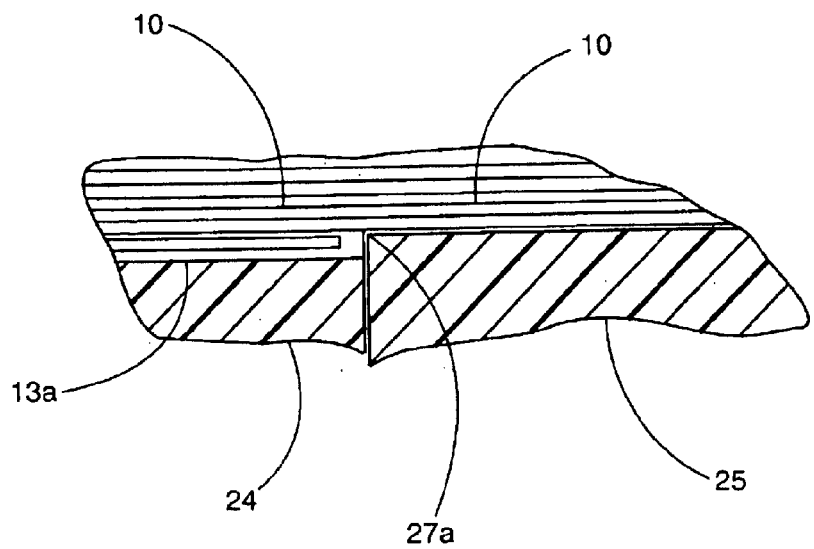
FIG. 10 is an enlargement of the circled portion of FIG. 9.

Referring to FIG. 9, it is an enlargement of FIG. 8. FIG. 10 is a further enlargement of the circled portion of FIG. 9. As can be seen in FIG. 9 a portion of the rib sidewall 13a within opening 27 can be sheared off or has been compressed within bore hole 27. The shearing of the rib, which is cut by the opening edge of hole 27a, will allow the remaining portions of dowel 10 to fit within the inside perimeter of opening 27. Therefore, rib 13 in FIG. 9 would only extend along the portion of dowel 10 that is in hole 26. Because the holes 26 and 27 in FIG. 9 are offset when the dowel was placed into workpieces 25 and 26, rib 13 would have been compressed, shaved or peeled. This shaved portion or thread not shown on the drawings would be further compressed if shaved off by the pressure between the two workpieces 24 and 25 or by the pressure of dowel 10 against the inside walls of bore holes 26 or 27 or both.

It is also believed, that dowel 10 may shift longitudinally causing corner 27a to dig into rib 13. This digging at the corner 27a increases the rigidity of dowel 10 within the holes 26 and 29.

As just seen in displayed FIGS. 8, 9 and 10 the alignment of the openings 26 and 27 is off or one opening is displaced from the other by the distance of the height of a single rib.

Figure 11:
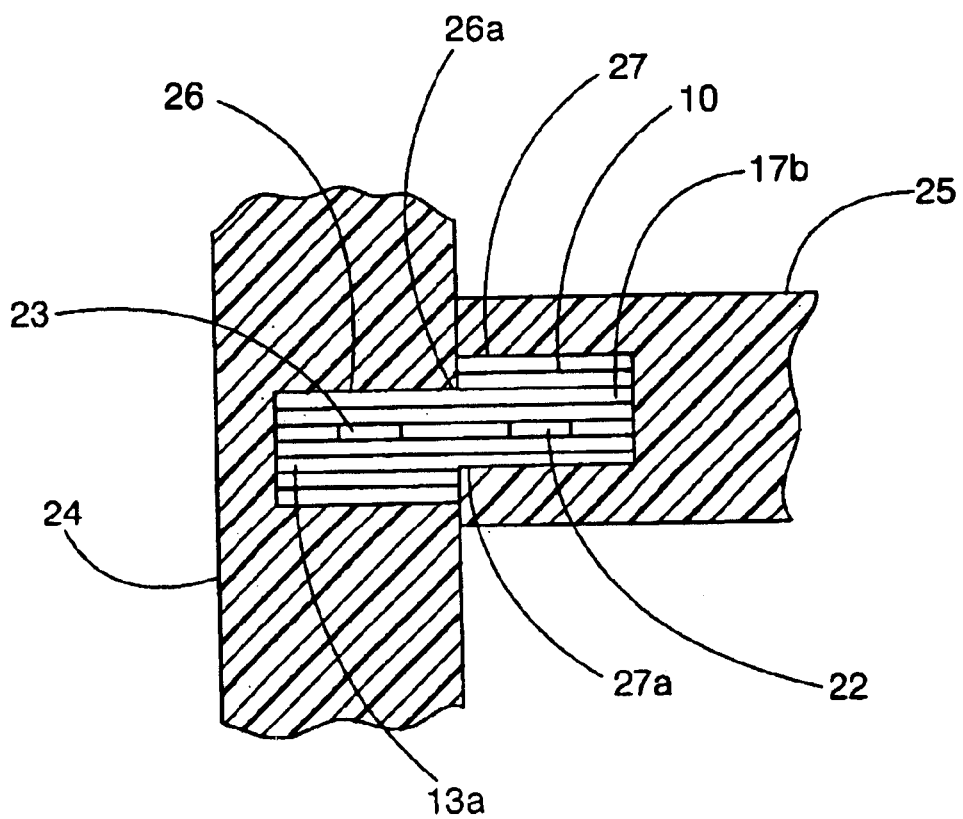
FIG. 11 is a cross sectional view of the two workpieces not aligned with the dowel in place.

Referring to FIG. 11 is an example where the alignment of the two bore holes 26 and 27 is off by the height of two ribs.

In FIG. 11 the arrangement is such that a portion of the rib sidewall 17b does not extend into the opening 26. Likewise a portion of the rib sidewall 13a does not extend into opening 27. Likewise dowel 10 rotates about its central longitudinal axis so that the corners of the respective pieces 27a of workpiece 25 and the corner 26a of workpiece 24 would dig into dowel 10 providing extra support for the dowel within the two opposed openings. Adjacent rib sidewall portion 17b is a space within opening 27. Likewise adjacent rib sidewall portion 13a is a space within opening 26.

In an alternative embodiment, illustrated in FIGS. 12 and 13, the cylindrical dowel 10 includes a longitudinal bore 100 extending from round circular face 19 to opposite round circular face 20. Longitudinal bore 100 serves to hollow out cylindrical dowel 10, resulting in less polyethylene material being used in forming dowel 10.

In summary the present invention is an improved dowel having one or more pairs of opposed ribs. The material of the dowel is such that the longitudinal shear strength of the dowel portion at the joint of a rib at the circumference of the dowel is less than the load strength of the dowel, by a factor of 2 to 1. The height of each rib is approximately 15% the diameter of the dowel without the ribs. Since the rib can be sheared off the amount of distance of adjustability for tolerances that the rib can adjust for is twice the height of a rib.

While only a few embodiments of the present invention have been described in detail above, those skilled in the art will readily appreciate that numerous modifications to the exemplary embodiments are possible without materially departing from the novel teachings and advantages of this invention. Accordingly, all such modifications are intended to be included within the scope of this invention as defined in the following claims.

What is claimed is:

1. A ribbed dowel for aligning work pieces comprising:
   a cylindrical body having an outer surface, a first end, and a second end substantially similar to said first end;
   a plurality of ribs each having a first tapered end and a second tapered end, first and second sidewalls having lower edges intersecting said outer surface and spaced parallel to one another over said outer surface, wherein each said rib extends longitudinally from said first end to said second end, and wherein at least one of said ribs deformable against at least one opening of said workpiece;
   a round circular first face on said first end wherein said first tapered end intersects said first face;
   a round circular second face on said second end wherein said second tapered end intersects said second face; and
   wherein said ribbed dowel is composed of material other than a polypropylene homopolymer having density of 0.905 g/cm3, a melt flow rate of 60 g/10 min, a Rockwell hardness of 107, a Durometer hardness of 84, and a melting point of 330° F.

2. The ribbed dowel according to claim 1 wherein said cylindrical body includes a longitudinal bore extending from said round circular first face to said round circular second face.

3. The ribbed dowel according to claim 1 wherein said ribs include a tapered front face.

4. The ribbed dowel according to claim 3 wherein said ribs include a tapered rear face.

5. The ribbed dowel according to claim 4 wherein said tapered front face intersects with and meets said round circular first face.

6. The ribbed dowel according to claim 5 wherein said tapered rear face intersects with and meets said round circular second face.

7. The ribbed dowel according to claim 1 wherein said material is a non-polypropylene homopolymer polyolefin.

8. The ribbed dowel according to claim 1 wherein said material is selected from the group consisting of polypropylene copolymers, polypropylene blends with homopolymer and/or copolymer polypropylene, polyethylene, polyethylene blends, filled polypropylenes, Acrylonitrile-Butadiene-Styrene (ABS), nylons, high-impact polystyrene, and polypropylene homopolymers having a density of 0.905 g/cm³, a melt flow rate of 60 g/10 min, a Rockwell hardness of 107, a Durometer hardness of 84, and a melting point of 330° F.

9. A ribbed dowel for aligning work pieces comprising:
a cylindrical body having an outer surface, a first end, and a second end substantially similar to said first end;
a plurality of ribs each having a first tapered end and a second tapered end, first and second sidewalls having lower edges intersecting said outer surface and spaced parallel to one another over said outer surface, wherein each said rib extends longitudinally from said first end to said second end, and wherein at least one of said ribs deformable against at least one opening of said workpiece;
a round circular first face on said first end wherein said first tapered end intersects said first face;
a round circular second face on said second end wherein said second tapered end intersects said second face; and
wherein said ribbed dowel is composed of material other than a polypropylene homopolymer having density of 0.905 g/cm3, a melt flow rate of 60 g/10 min, a Rockwell hardness of 107, a Durometer hardness of 84, and a melting point of 330° F.

10. A ribbed dowel for aligning work pieces comprising:
a cylindrical body having an outer surface, a first end, and a second end substantially similar to said first end;
a plurality of ribs each having a first tapered end and a second tapered end, first and second sidewalls having lower edges intersecting said outer surface and spaced parallel to one another over said outer surface, wherein each said rib extends longitudinally from said first end to said second end at a uniform height, and wherein at least one of said ribs deformable against at least one opening of said workpiece;
a round circular first face on said first end wherein said first tapered end intersects said first face;
a round circular second face on said second end wherein said second tapered end intersects said second face; and
wherein said ribbed dowel is composed of material other than a polypropylene homopolymer having density of 0.905 g/cm3, a melt flow rate of 60 g/10 min, a Rockwell hardness of 107, a Durometer hardness of 84, and a melting point of 330° F.

11. The ribbed dowel according to claim 10 wherein said cylindrical body includes a longitudinal bore extending from said round circular first face to said round circular second face.

12. The ribbed dowel according to claim 10 wherein said ribs include a tapered front face.

13. The ribbed dowel according to claim 12 wherein said ribs include a tapered rear face.

14. The ribbed dowel according to claim 13 wherein said tapered front face intersects with and meets said round circular first face.

15. The ribbed dowel according to claim 14 wherein said tapered rear face intersects with and meets said round circular second face.

16. The ribbed dowel according to claim 10 wherein said material is a non-polypropylene homopolymer polyolefin.

17. The ribbed dowel according to claim 10 wherein said material is selected from the group consisting of polypropylene copolymers, polypropylene blends with homopolymer and/or copolymer polypropylene, polyethylene, polyethylene blends, filled polypropylenes, Acrylonitrile-Butadiene-Styrene (ABS), nylons, high-impact polystyrene and polypropylene homopolymers having a density of 0.905 g/cm³, a melt flow rate of 60 g/10 min, a Rockwell hardness of 107, a Durometer hardness of 84, and a melting point of 330° F.

* * * * *